(12) United States Patent
Liang

(10) Patent No.: US 11,501,129 B2
(45) Date of Patent: Nov. 15, 2022

(54) ANTENNA STRUCTURE AND DEVICE USING THE SAME

(71) Applicant: Securitag Assembly Group Co., Ltd, Taichung (TW)

(72) Inventor: Kai-Jun Liang, Taichung (TW)

(73) Assignee: Securitag Assembly Group Co., Ltd, Taichung (TW)

( * ) Notice: Subject to any disclaimer, the term of this patent is extended or adjusted under 35 U.S.C. 154(b) by 0 days.

(21) Appl. No.: 16/577,851

(22) Filed: Oct. 8, 2019

(65) Prior Publication Data

US 2020/0151536 A1 May 14, 2020

(30) Foreign Application Priority Data

Oct. 25, 2018 (TW) ................. 107137701

(51) Int. Cl.
*G06K 19/077* (2006.01)
*H01Q 9/26* (2006.01)

(52) U.S. Cl.
CPC ......... *G06K 19/07773* (2013.01); *H01Q 9/26* (2013.01)

(58) Field of Classification Search
CPC ............................ G06K 19/07773; G01Q 9/26
See application file for complete search history.

(56) References Cited

U.S. PATENT DOCUMENTS

| | | |
|---|---|---|
| 2008/0316020 A1 | 12/2008 | Robertson et al. |
| 2012/0092027 A1 | 4/2012 | Forster |
| 2015/0090801 A1* | 4/2015 | Omura ............. G06K 19/07771 235/492 |
| 2016/0172760 A1 | 6/2016 | Brown et al. |
| 2018/0115073 A1* | 4/2018 | Sakurai .................... H01Q 1/38 |
| 2019/0130239 A1* | 5/2019 | Kimura ............. G06K 19/0776 |

OTHER PUBLICATIONS

Taiwanese Office Action, dated Oct. 3, 2019, in a counterpart Taiwanese patent application, No. TW 107137701.
Alien Technology, "ALN-9720 HS "HiScan" Inlay", Nov. 27, 2013, Morgan Hill, CA, www.alientechnology.com. 4 pages.
Invengo Technology Pte. Ltd., "Invengo Scorpion", 2018, invengo.com, 2 pages.
"Impinj UHF Inlay (Impinj's Monza series authenticated manufacturer in China)", unknown, before Sep. 20, 2019.

* cited by examiner

*Primary Examiner* — Thien M Le
*Assistant Examiner* — Asifa Habib
(74) *Attorney, Agent, or Firm* — Chen Yoshimura LLP

(57) ABSTRACT

An antenna structure comprises an impedance matching part, a first conductive structure and a second conductive structure. The first conductive structure with a first length along a first direction is coupled to a first side of the impedance matching part and has a plurality of first polygon conductive structures, each of which is coupled to each other through a first conductive element. The second conductive structure with a second length along a first direction is coupled to a second side of the impedance matching part and has a plurality of second polygon conductive structures, each of which is coupled to each other through a second conductive element, wherein the second length is larger than the first length. The first and second polygon conductive structures are protrusion toward the second direction. In one embodiment, the antenna structure can be applied on an object having metal housing or liquid contained therein.

40 Claims, 6 Drawing Sheets

ANTENNA STRUCTURE AND DEVICE USING THE SAME

This application claims the benefit of Taiwan Patent Application Serial No. 107137701, filed Oct. 25, 2018, the subject matter of which is incorporated herein by reference.

BACKGROUND OF INVENTION

1. Field of the Invention

The present invention relates to an antenna structure, and more particularly, to an antenna structure or device having the antenna structure that could be utilized on a metal surface or a surface of an object having liquid contained therein.

2. Description of the Prior Art

Please refer to FIG. 1, which illustrates a conventional antenna structure. A center area of the antenna structure 1 has an impedance matching part 10. The two sides of the impedance matching part 10 respectively have conductive structures 11 and 12 having identical structure, and identical dimension, respectively. The conductive structures 11 and 12 are symmetrically coupled to the two opposites of the impedance matching part 10 for forming a symmetrical dipole antenna (half wavelength).

General speaking, the far-field symmetrical dipole antenna shown in FIG. 1 could be utilized as a medium for emitting or receiving wireless signal in the UHF RFID field. However, in some specific application fields, such as liquid or metal condition, the signal could not be effectively emitted through the UHF antenna so that the performance of the interrogation distance between the antenna and RFID reader could not be well thereby affecting performance of the antenna. The main reason for causing this problem is because when the antenna structure is close to the liquid, a reversing electric current would be induced at the symmetrical dipole antenna so as to cancel the operation electric current of the antenna structure whereby the radiation capability of the antenna structure could not be effectively performed.

Conventional art, such as the US. Pub. No. US20120092027, for example, disclosed an antenna structure for detecting liquid environment. The antenna structure is a symmetric antenna structure, and a center area of the antenna structure further coupled to a capacitor structure that is gradually tapered toward the center area such that the antenna structure could be utilized in the liquid-containing field.

SUMMARY OF THE INVENTION

The present invention provides an antenna structure having asymmetric short part and long part structures and device using the antenna structure, wherein a characteristic that electric current path of the short part structure and electric current path of the long part structure are not identical is utilized to delay a phase variation with respect to an induced current generated in the antenna structure near the liquid medium whereby a cancellation between the operation electric current and induced electric current could be reduced such that the antenna structure can be effectively radiated.

In one embodiment, the present invention provides an antenna structure comprises an impedance matching part, a first conductive structure, and a second conductive structure. The impedance matching part comprises a first electrical connection terminal, and a second electrical connection terminal. The first conductive structure is coupled to a first side of the impedance matching part. The first conductive structure has a first length along a first direction and has a plurality of first conductive parts wherein ends of two adjacent first conductive parts are coupled by a first conductive element, and the plurality of first conductive parts are protruded toward a second direction perpendicular to the first direction. The second conductive structure is coupled to a second side of the impedance matching part and has a second length which is larger than the first length along the first direction. The second conductive structure further has a plurality of second conductive parts wherein ends of two adjacent second conductive parts are coupled by a second conductive element, and the plurality of second conductive parts are protruded toward the second direction perpendicular to the first direction.

In one embodiment, the present invention further provides a device having antenna structure comprising an object and an antenna structure. The object has a liquid contained therein. The antenna structure is arranged on a surface of the object wherein the liquid is at another side opposite to the surface, and the antenna structure further comprises an impedance matching part, a first conductive structure, and a second conductive structure. The impedance matching part comprises a first electrical connection terminal, and a second electrical connection terminal. The first conductive structure is coupled to a first side of the impedance matching part. The first conductive structure has a first length along a first direction and has a plurality of first conductive parts wherein ends of two adjacent first conductive parts are coupled by a first conductive element and the plurality of first conductive parts are protruded toward a second direction perpendicular to the first direction. The second conductive structure is coupled to a second side of the impedance matching part. The second conductive structure has a second length which is larger than the first length along the first direction, and has a plurality of second conductive parts wherein ends of two adjacent second conductive parts are coupled by a second conductive element, and the plurality of second conductive parts are protruded toward the second direction perpendicular to the first direction.

In one embodiment, a center position of the first electrical connection terminal and the second electrical connection terminal is located at a side of a center line of the impedance matching part.

Alternatively, in another embodiment, the antenna structure further comprises a meander conductive structure arranged between the first conductive structure and the impedance matching part, wherein two ends of the meander conductive structure are electrically coupled to the first conductive structure and the impedance matching part, respectively.

Alternatively, in another embodiment, the antenna structure further comprises a meander conductive structure arranged between the second conductive structure and the impedance matching part, wherein two ends of the meander conductive structure are electrically coupled to the second conductive structure and the impedance matching part, respectively.

In one embodiment, each first conductive part or second conductive part is a polygon structure or has a curvature structure, wherein the polygon structure is a rectangular structure, triangle structure or trapezoid structure.

In one embodiment, the antenna further comprises a substrate configured to support the impedance matching part, the first conductive structure, and the second conductive structure, wherein the substrate is a PET substrate or a PCB substrate.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an antenna structure and device using the same. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2A:
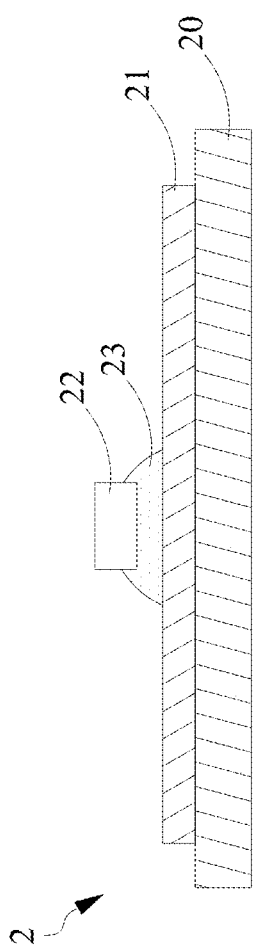
FIG. 2A illustrates a RFID module according to one embodiment of the present invention.
Figure 2B:
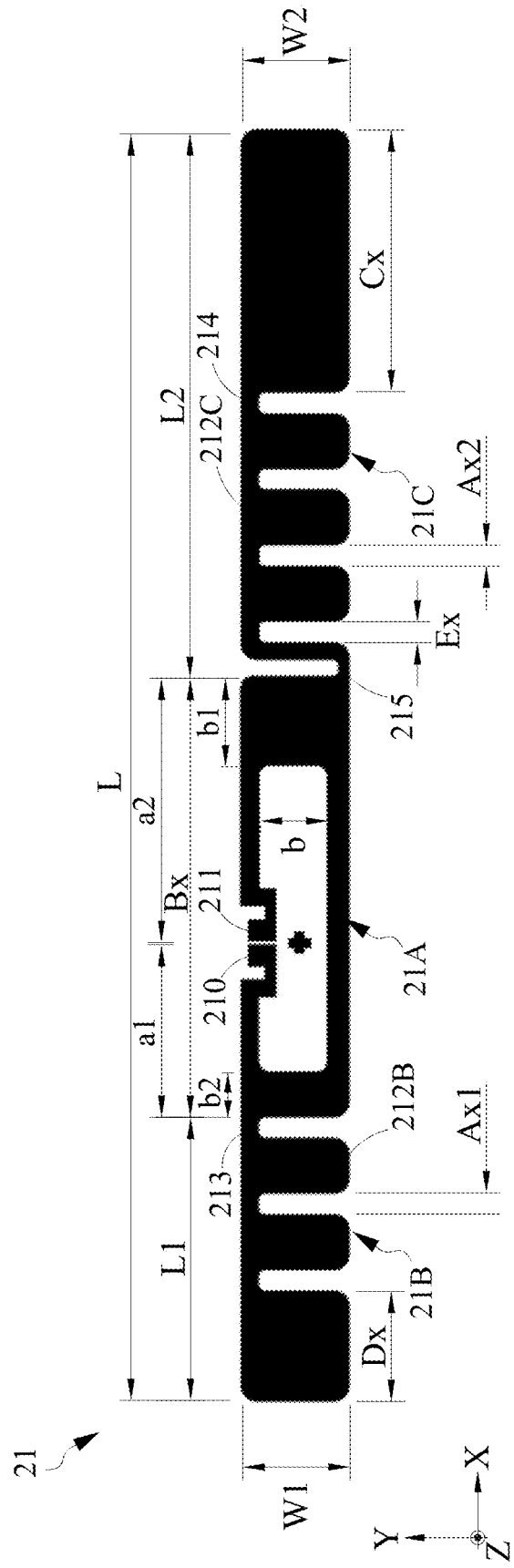
FIG. 2B illustrates an antenna structure according to one embodiment of the present invention.

Please refer FIGS. 2A and 2B, wherein FIG. 2A is referred to a RFID module according to one embodiment of the present invention while FIG. 2B illustrates an antenna structure according to one embodiment of the present invention. The RFID module 2 comprises a substrate 20, an antenna structure 21, and a RFID chip 22. In one embodiment, the substrate 20 is a stiff material such as PCB substrate or chip on board (COB), for example. Alternatively, the substrate 20 could be a flexible substrate, such as polyimide (PI) substrate, or polyethylene terephthalate (PET) substrate. In the present embodiment, the substrate 20 is PET substrate. The antenna structure 21 formed on a top surface of the substrate 20. The material for forming the antenna structure 21 could be, but should not be limited to, copper, aluminum, or other metal material that could be utilized as the antenna material. In the present embodiment, the antenna structure 21 is formed by aluminum material shaped by an etching process for forming the layout shown in FIG. 2B.

The antenna structure 21 comprises three areas including impedance matching part 21A, a first conductive structure 21B, and a second conductive structure 21C. The impedance matching part 21A has a first electrical connection terminal 210 and a second electrical connection terminal 211. The length of the impedance matching part 21A is Bx along the first direction X axis. In the present embodiment, a center between the first electrical connection terminal 210 and the second electrical connection terminal 211 is laterally biased from the centerline of the impedance matching part 20A. In another words, the first and second electrical connection terminals 210 and 211 are not located at any positions on the centerline of the impedance matching part 20A. In the present embodiment, the impedance matching part 20A is a T-typed impedance matching structure for adjusting impedance matching status between the antenna and the IC chips 22 on the antenna structure 21.

Figure 2C:
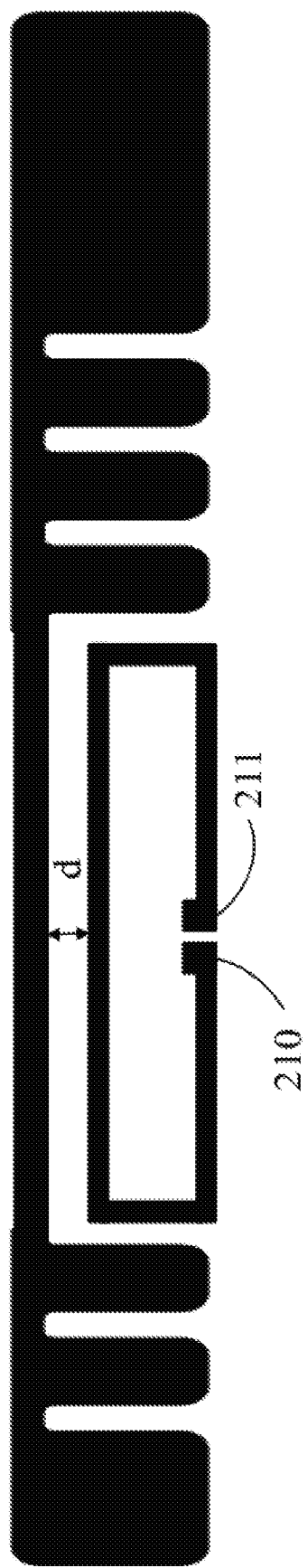
FIG. 2C illustrates an antenna structure according to another embodiment of the present invention.

In the present embodiment, the input impedance of the antenna structure 21 could be adjusted to match with the impedance of the IC chips 22 though adjusting the length Bx, length a1, referred to the length from the first electrical connection terminal 210 to the left end of the impedance matching part 21A, length a2, referred to the length from the second electrical connection terminal 211 to the right end of the impedance matching part 211, width b1, referred to the dimension of the conductive structure at right side of the impedance matching part 21A, and width b2, referred to the dimension of the conductive structure at the left side of the impedance matching part 21A. Besides, it is noted that the impedance matching part 21A is not limited to the layout shown in FIG. 2B. For example, in another embodiment, the impedance matching part 21A' shown in FIG. 2C is an indirectly coupled structure, which is also called magnetic coupling structure. The way for adjusting the impedance matching of the antenna structure shown in FIG. 2C is also different from the antenna structure shown in FIG. 2B. In the embodiment shown in FIG. 2C, the impedance of the antenna structure 21' is adjusted to match with the impedance of the IC chips 22 through changing the length d.

Please refer back to the FIG. 2B. The impedance matching part 21A has a first side and a second side respectively at the two opposite lateral ends of the impedance matching part 21A. The first conductive structure 21B is electrically coupled at the first side of the impedance matching part 21A. The first conductive structure 21B comprises a plurality of first conductive parts 212B adjacently coupled to each other for being as a capacitive load structure.

In the present embodiment, ends of each of two adjacent first conductive parts 212B are coupled to each other through a first conductive element or wire 213. In the present embodiment, the plurality of first conductive elements 213 are respectively coupled to the first conductive parts 212B at the same side. Any two adjacent first conductive parts 212B has a gap Ax1 therebetween along the first direction X axis. In addition, the first conductive structure 21B has a first length L1 along the first direction and the plurality of first conductive parts 212B are respectively protruded a width W1 along a second direction Y axis perpendicular to the first direction X axis. In the present embodiment, the first conductive part 212B is a rectangular structure completely filled with the aluminum material.

The second conductive structure 21C is electrically coupled to the second side of the impedance matching part 21A. The second conductive structure 21C further comprises a plurality of second conductive parts 212C for being as a capacitive load structure. In the present embodiment, any two adjacent second conductive parts 212C respectively have one end that are coupled to each other through a second conductive element 214. In the present embodiment, the second conductive elements 214 are arranged at the same side of the second conductive parts 212C. The two adjacent second conductive parts 212C has a gap Ax2. It is noted that the gaps Ax1 and Ax2 could be the same as each other or different from each other. The second conductive structure 21C has a second length L2 along the first direction X axis wherein the second length L2 is larger than the first length L1. The second conductive parts 212C are protruded a width W2 toward the second direction Y axis perpendicular to the first direction X axis. It is noted that the width W1 of the first conductive part 212B and the width W2 of the second conductive part 212C could be the same as each other or different from each other.

In the present embodiment, the second conductive part 212C is a rectangular structure that is filled with the aluminum material. Since the length of the first conductive structure 21B is short and the length of the second conductive structure 21C is long, the path of electric current in the second conductive structure 21C is larger than the path of the electric current in the first conductive structure 21B. The non-identical lengths of the first and second conductive structures 21B and 21C construct a asymmetric antenna structure 21 that could generate a retardation effect on the phase variation of induced electric current in the antenna structure arranged on a metal surface or on a surface that is close to the liquid medium whereby the cancellation of the electric current between the operation electric current and induced electric current could be reduced thereby enabling the antenna structure effectively radiating.

In the present embodiment, the second conductive structure 21C further comprises a meander conductive structure 215 formed between the impedance matching part 21A and the second conductive structure 21C. The bending angle of meander conductive structure 215 could be, but should not be limited to, 90 degree. In the present embodiment, a first gap Ex1 is formed between the meander conductive structure 215 and the adjacent second conductive part 212C and a second gap Ex2 between the meander conductive structure 215 and the end of the impedance matching part 21A, wherein the first gap Ex1 and the second gap Ex2 could be the same or different from each other. In the present embodiment, the gaps are the same as each other, which are ranged around 0.2~5 mm.

The total length L of the antenna structure 21 is between 50~75 mm, and the width W1 or W2 of the antenna structure 21 is between 3~20 mm. In the present embodiment, the dimension of the antenna structure is 60 mm×5 mm. The dimension Ax1 and Ax2 could be between 2~7 mm while Bx could be between 13~30 mm. It is noted that the dimension of the plurality of first conductive parts 212B could be the same or different form each other. For example, in the embodiment shown in FIG. 2B, the leftmost first conductive part 212B has a length Dx along the first direction X axis, which is between 3~15 mm and the dimension of the leftmost first conductive part 212B is larger than the other first conductive part 212B. Likewise, the dimension of the plurality of second conductive parts 212C could be the same or different form each other. For example, in the embodiment shown in FIG. 2B, the rightmost second conductive part 212C has a length Cx along the first direction X axis, which is between 5~30 mm. Alternative, the dimension of the first conductive part 212B could be the same as or different from the dimension of the second conductive part 212C. For example, in the embodiment shown in FIG. 2B, the leftmost first conductive part 212B is different from the rightmost second conductive part 212C. Similarly, the dimension along the second direction Y axis of the first conductive part 212B could also be the same as or different from each other, and the dimension along the second direction Y axis of the second conductive part 212C could also be the same as or different from each other. It is also noted that the dimension along the second direction Y axis of the first and the second conductive parts could also be the same as or different from each other.

Figure 3A:
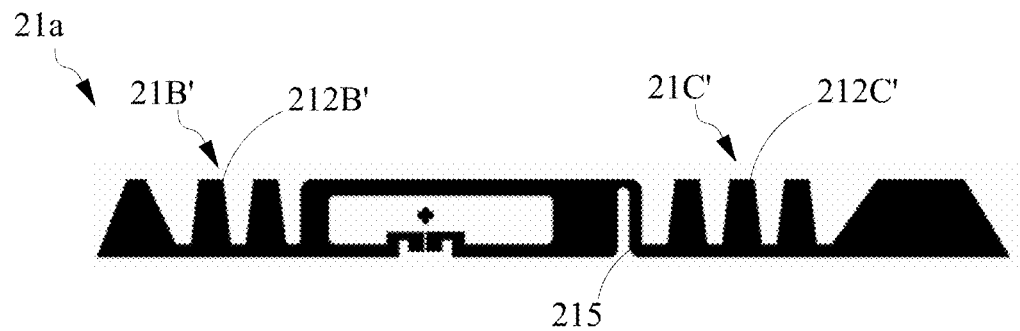
FIGS. 3A and 3B respectively illustrate alternative antenna structure according to one embodiment of the present invention.
Figure 3B:
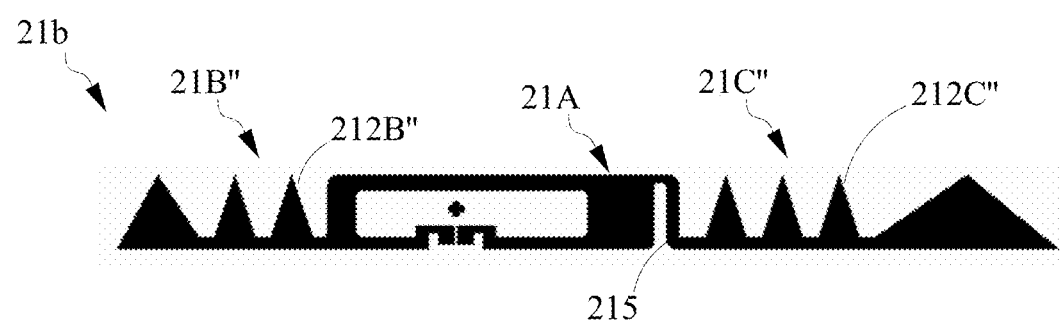

Please refer to FIGS. 3A and 3B, which respectively illustrates antenna structure according to another embodiment of the present invention. The first and the second conductive parts could be polygon structure. In the embodiment shown in FIG. 2B, the shapes of the first conductive parts 212B or the second conductive parts 212C are the rectangular structure while, alternatively, the shape could also be, but should not be limited to, triangle structure or trapezoid structure. For example, in the FIG. 3A, the first and the second conductive parts 212B' and 212C' of the antenna structure 21a are trapezoid structure. In the embodiment shown in FIG. 3B, the first and the second conductive parts 212B" and 212C" of the antenna structure 21b are triangle structure. In addition, although the shape of first and second conductive parts in the previously-described embodiments are the same as each other, alternatively, the shape of the first and second conductive parts could be different from each other. For example, the first conductive part is rectangular structure and the second conductive part is triangle structure or trapezoid structure. It is also noted that, in addition to the polygon structure, the first and second conductive parts could also be structures having curvature shape, such as elliptical shape or circular shape, for example.

Figure 3C:
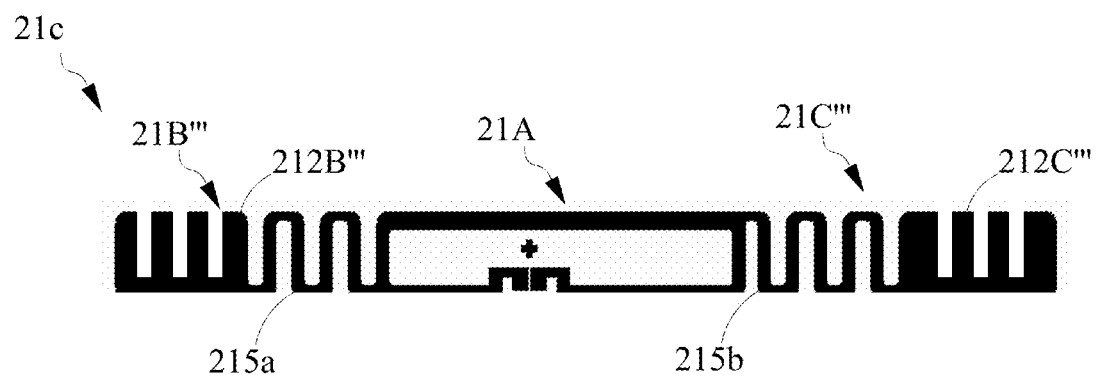
FIG. 3C illustrates alternative antenna structure according to one embodiment of the present invention.

Besides, please refer to FIG. 3C, which illustrates another antenna structure according to one embodiment of the present application. In the present embodiment, a first meander conductive structure 215a is arranged between the first conductive structure 21B''' and the impedance matching part 21A while a second meander conductive structure 215b is arranged between the second conductive structure 21C''' and the impedance matching part 21A. Each meander conductive structure 215a or 215b has a plurality of bending elements. In the embodiment shown in FIG. 3C, unlike the embodiments shown in FIGS. 2B, 3A and 3B, the meander conductive structure 215a is arranged between the first conductive structure 21B''' and the impedance matching part 21A. In another words, the leftmost end of the impedance matching part 21A is coupled to the meander conductive structure 215a, and then coupled to the first conductive parts 212B'''. Moreover, it is noted that although there has meander conductive structure 215 or 215b between the impedance matching structure 21A and the second conductive structure 21C, 21C', 21C" or 21C''' in the previously described embodiments, in another embodiment, the second conductive structure 21C, 21C', 21C", or 21C''' could be directly coupled to the impedance matching part 21A without any meander conductive structure arranged therebetween.

Referring back to FIGS. 2A and 2B, the first and the second electrical connection terminals 210 and 211 respectively represents the positive electrode and the negative electrode. The two terminals 210 and 211 are electrically coupled to the RFID chip 22. The RFID chip 22 is an ultra high frequency (UHF) RFID chip. In the present embodiment, a conductive paste 23 is arranged between the RFID chip 22 and the first and second electrical connection terminals 210 and 211 such that the RFID chip 22 is electrically coupled to the first and second electrical connection terminals 210 and 211. The conductive paste 23 could be, but should not be limited to, anisotropic conductive film (ACF), anisotropic conductive paste (ACP) or anisotropic conductive adhesive (ACA).

Figure 4:
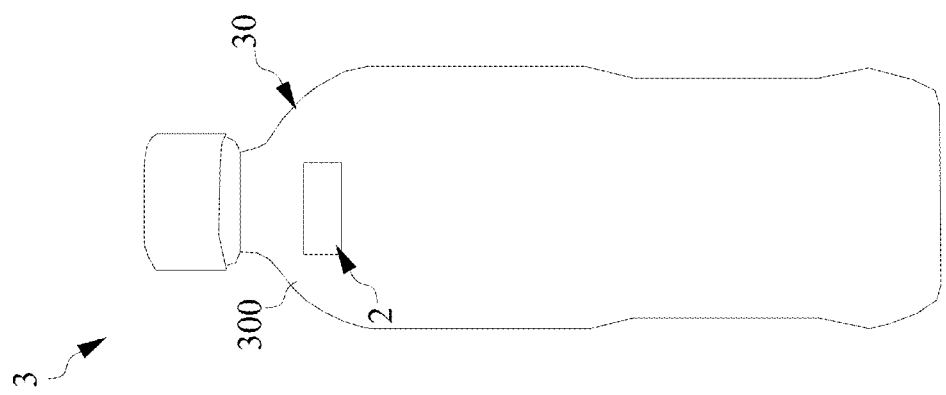
FIG. 4 illustrates a device having an antenna structure according to one embodiment of the present invention.

Please refer to FIG. 4, which illustrates a device having the antenna structure according to one embodiment of the present invention. In the present embodiment, the device 3 comprises an object 30 and a RFID module 2. The object 30 has a housing 300 having an internal surface and an external surface, wherein a liquid, such as water or beverage, for example, is arranged inside the housing 300 and contacts the internal surface. In the present embodiment, the object 30 could be, but should not be limited to, a beverage container. The housing 300 could be a plastic housing, metal-made housing, Tetra Pak® package, or paper-made package. The RFID module 2 is arranged on the external surface of the object 30. In one embodiment, the antenna structure of RFID module 2 could be the embodiments shown in FIGS. 2A-2B or FIGS. 3A-3C.

Figure 1:
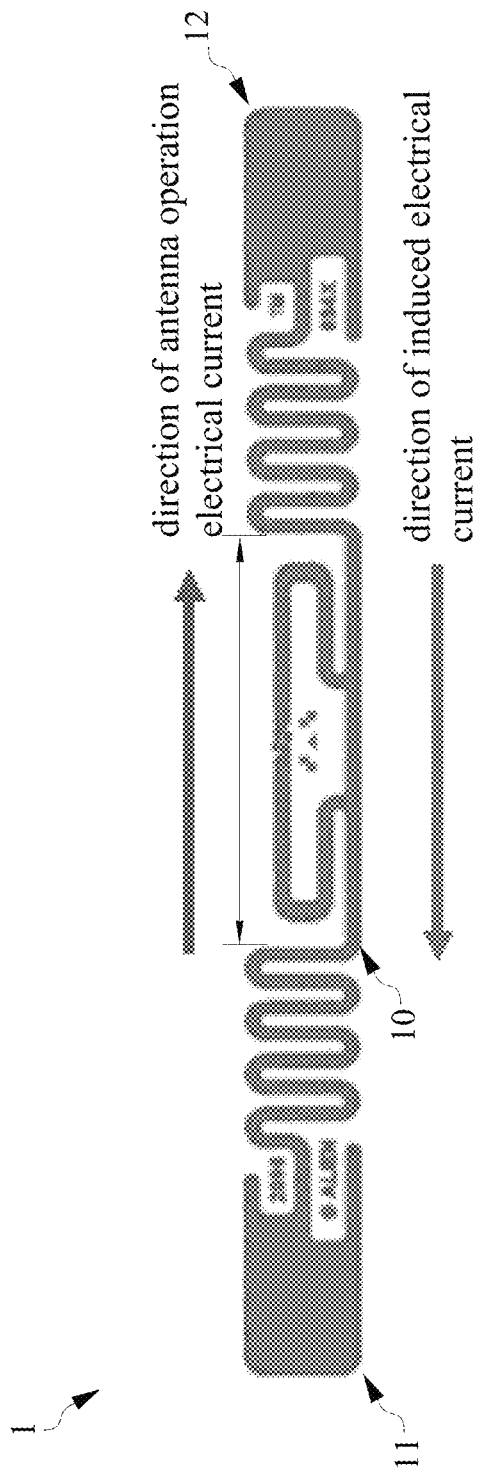
FIG. 1 illustrates a conventional symmetric dipole antenna structure (half wavelength)
Figure 5:
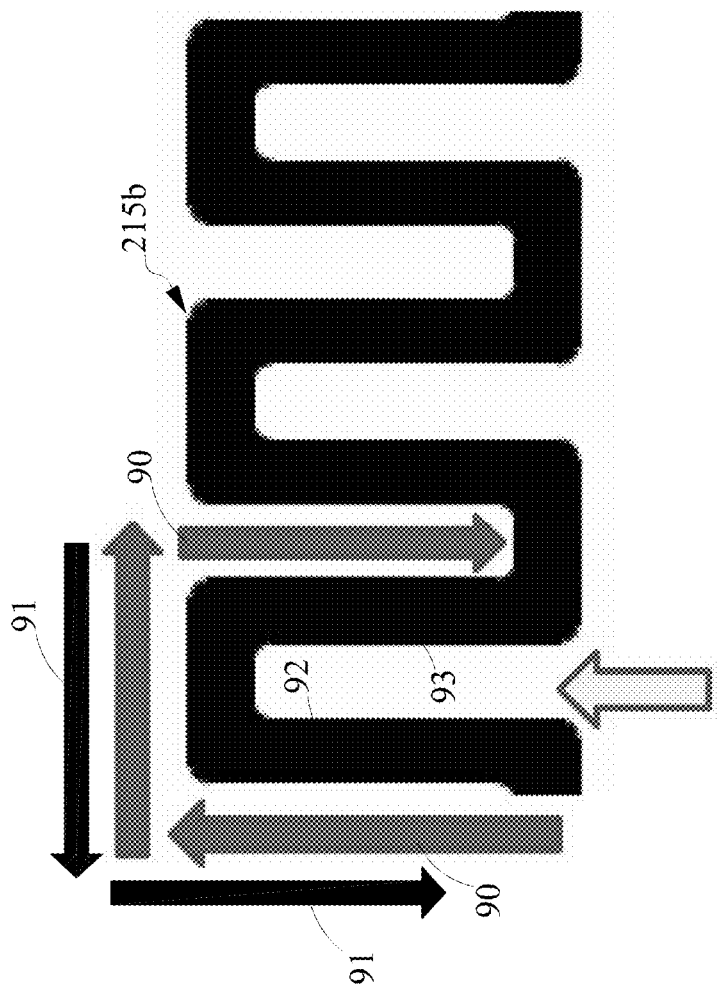
FIG. 5 illustrates a transmission of electric current in the conventional antenna structure.

Next, the operation principle according the present invention is explained below. Please refer to FIG. 1, the main reason that the conventional antenna structure, e.g. symmetrical dipole antenna, could not effectively radiates frequency signals is because a reversing electric current is induced when the antenna structure is stuck onto the surface near the liquid whereby the original operating electric current will be canceled by the reversing electric current so that the antenna can't effectively radiated. Please refer to FIG. 5, which illustrates an induced current generated by the meander conductive structure. In the conventional antenna structure having meander conductive structure, when the electric current 90 is transmitted by the meander conductive structure, a reversing electric current 91 will be induced due to the bending elements. In the structure shown in FIG. 5, the cancellation of electric currents 90 and 91 is seriously occurred due to the coupling effect generated by the bending elements 92 and 93 so that the energy could not be effectively radiated by the antenna structure. However, in the present invention, the asymmetric conductive structure such as 21B and 21C, for example, having the plurality of conductive parts 212B and 212C are constituted as the capacitive load structure. Although the reversing electric current will also be generated, without the influence of coupling effect generated by the meander conductive structure, the cancellation of electric current will be reduced so that the energy could be effectively radiated by the antenna structure.

In addition, it is noted that although the embodiment shown in FIG. 3C has a combination of the meander conductive structure and asymmetric conductive structures, when it is applied to the object having the liquid contained therein, the interrogation distance between the RFID reader and RFID chip will be shorter than it is applied to the object without the liquid. On the contrary, the interrogation distance of the antenna structure shown in FIGS. 2B, 3A, and 3B applied to the object having liquid is larger than the interrogation distance when the antenna structure is applied to the object without the liquid. It is noted that the object having the liquid comprises conditions such as the water drops or water stream formed on the surface of the object or liquid contained within the object, for example.

Figure 6A:
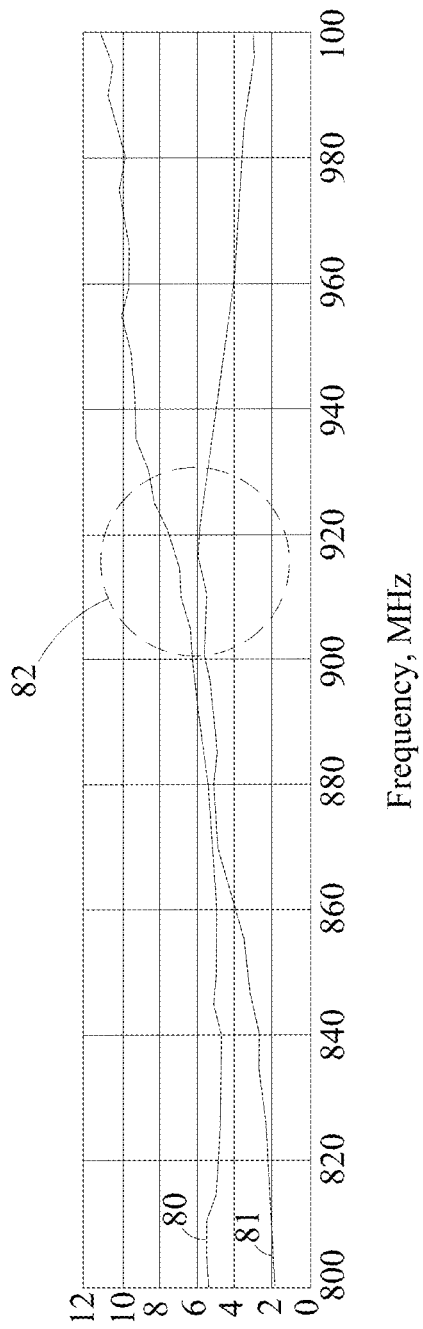
FIGS. 6A and 6B respectively illustrate an interrogation distance curve corresponding to the antenna structure shown in FIG. 2b and FIG. 3C when each antenna structure shown in FIG. 2b and FIG. 3C are utilized in the environment having liquid medium as well as without liquid medium.
Figure 6B:
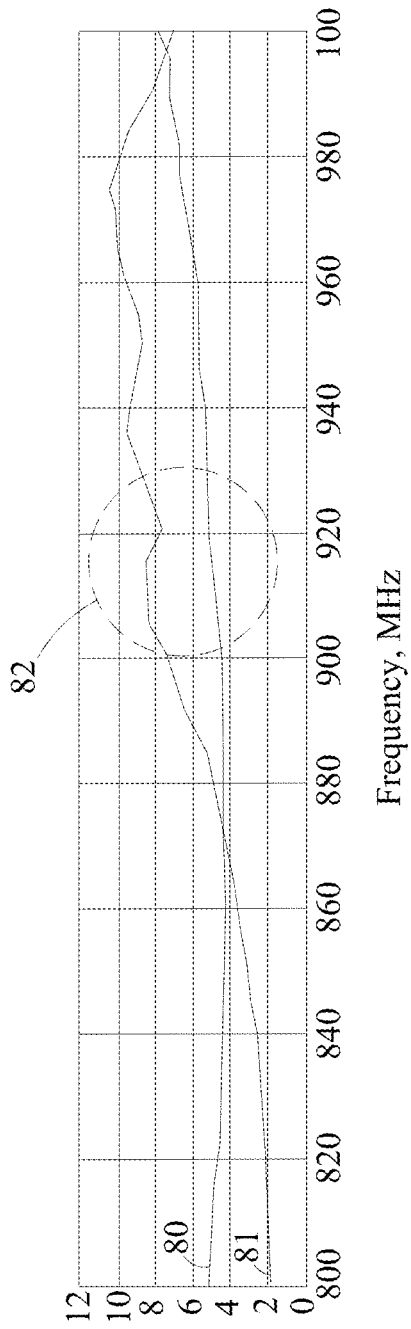

Please refer to FIGS. 6A and 6B, which respectively illustrate an interrogation distance curve corresponding to the antenna structure shown in FIG. 2B and FIG. 3C when each antenna structure shown in FIG. 2B and FIG. 3C are utilized in the environment having liquid medium as well as without liquid medium. The curve 80 refers to the curve of interrogation distance when the object contains liquid while the curve 81 refers to the interrogation distance when the object has no liquid.

In the FIGS. 6A and 6B, the area 82 is referred to the interrogation range when the operation frequency is UHF with frequency range between 900 MHz to 940 MHz. The UHF frequency range in the area 82 is only an example for explaining the interrogation distance, and the frequency range is not the limitation of the present invention. In FIG. 6A, it is shown that the interrogation distance of the object having liquid is larger than the interrogation distance when the object having no liquid. However, in the FIG. 6B, it is noted that the waterproof capability of the antenna structure shown in FIG. 3C is inferior than the antenna structure shown in FIG. 2B because of the multiple segments of bending elements are formed as the meander conductive structure. Nevertheless, the antenna structure shown in FIG. 3C is still better than the conventional symmetric antenna structure because the structure in FIG. 3C has asymmetric capacitive load structure so the antenna structure shown in FIG. 3C still can solve the problem occurred in the prior arts. The user could select proper antenna structure according to the embodiment shown in FIGS. 2B and 3A-3C for fitting the user's need.

While the present invention has been particularly shown and described with reference to a preferred embodiment, it will be understood by those skilled in the art that various changes in form and detail may be without departing from the spirit and scope of the present invention.

What is claimed is:
1. An antenna structure, comprising:
an impedance matching part, comprising a first electrical connection terminal, and a second electrical connection terminal;
a first conductive structure, connected to a first side of the impedance matching part, the first conductive structure having a first length along a first direction and having a plurality of first conductive parts wherein a first end of each one of the plurality of first conductive parts is connected to a first end of an adjacent one of the plurality of first conductive parts by a first conductive element, and each one of the plurality of first conductive parts extends from the first end to a second end along a second direction perpendicular to the first direction and the second end of each one of the plurality of first conductive parts is unconnected to the second end of any other one of the plurality of first conductive parts; and
a second conductive structure, connected to a second side of the impedance matching part, the second conductive structure having a second length which is larger than the first length along the first direction, and having a plurality of second conductive parts wherein ends of two adjacent second conductive parts are connected by a second conductive element, and the plurality of second conductive parts are protruded toward the second direction perpendicular to the first direction;
wherein a quantity of the first conductive parts is different from a quantity of the second conductive parts.

2. The structure of claim 1, further comprising a meander conductive structure arranged between the second conductive structure and the impedance matching part, wherein two opposite ends of the meander conductive structure are respectively connected to the second conductive structure and the impedance matching part.

3. The structure of claim 1, wherein a width of each first conductive part along the first direction is the same as each other or different from each other.

4. The structure of claim 1, wherein a width of each second conductive part along the first direction is the same as each other or different from each other.

5. The structure of claim 1, further comprising:
a substrate, configured to support the impedance matching part, the first conductive structure, and the second conductive structure;
a RFID chip, electrically connected to the first and the second electrical connection terminals; and
a conductive paste layer, formed between the RFID chip and the first and the second electrical connection terminals.

6. The structure of claim 5, wherein the RFID chip is an ultra high frequency (UHF) chip.

7. The structure of claim 1, wherein each first conductive part or second conductive part is a polygon structure or has a curvature structure.

8. The structure of claim 7, wherein the polygon structure is a rectangular structure, triangle structure or trapezoid structure.

9. The structure of claim 1, wherein the first conductive structure is directly connected to a first side of the impedance matching part.

10. The structure of claim 1, wherein the first conductive structure is spaced apart from the impedance matching part in the first direction.

11. The device of claim 1, wherein the impedance matching part further comprises a first lateral conductive structure and a second lateral conductive structure spaced apart from each other along a second axis, wherein the first lateral conductive structure has a first top side connected to the first electrical connection terminal and a first bottom side spaced apart from the first top side along a first axis, and the second lateral conductive structure has a second top side connected to the second electrical connection terminal and a second bottom side spaced apart from the second top side along the first axis, wherein the first conductive structure is electrically connected to the first top side and the second conductive structure is electrically connected to the second bottom side.

12. The device of claim 1, wherein the impedance matching part further comprises a first lateral conductive structure and a second lateral conductive structure parallel to each other and spaced apart from each other along a first axis, wherein a width of the first lateral conductive structure along the first axis is different from a width of the second lateral conductive structure along the first axis.

13. An device having antenna structure, comprising:
an object, having a liquid contained therein; and
an antenna structure, arranged on a surface of the object, wherein the liquid is at another side opposite the surface, the antenna structure further comprising:
an impedance matching part, comprising a first electrical connection terminal, and a second electrical connection terminal;
a first conductive structure, connected to a first side of the impedance matching part, the first conductive structure having a first length along a first direction and having a plurality of first conductive parts wherein a first end of each one of the plurality of first conductive parts is connected to a first end of an adjacent one of the plurality of first conductive parts by a first conductive element, and each one of the plurality of first conductive parts extends from the first end to a second end along a second direction perpendicular to the first direction and the second end of each one of the plurality of first conductive parts is unconnected to the second end of any other one of the plurality of first conductive parts; and
a second conductive structure, connected to a second side of the impedance matching part, the second conductive structure having a second length which is larger than the first length along the first direction, and having a plurality of second conductive parts wherein ends of two adjacent second conductive parts are connected by a second conductive element, and the plurality of second conductive parts are protruded toward the second direction perpendicular to the first direction;
wherein a quantity of the first conductive parts is different from a quantity of the second conductive parts.

14. The device of claim 13, further comprising a meander conductive structure arranged between the second conductive structure and the impedance matching part, wherein two opposite ends of the meander conductive structure are respectively connected to the second conductive structure and the impedance matching part.

15. The device of claim 13, wherein a width of each first conductive part along the first direction is the same as each other or different from each other.

16. The device of claim 13, wherein a width of each second conductive part along the first direction is the same as each other or different from each other.

17. The device of claim 13, wherein the antenna structure further comprises:
a substrate, configured to support antenna structure, wherein the substrate is a PET substrate or a PCB substrate;
a RFID chip, electrically connected to the first and the second electrical connection terminals, wherein the RFID chip is a ultra high frequency (UHF) chip; and
a conductive paste layer, formed between the RFID chip and the first and the second electrical connection terminals.

18. The device of claim 13, wherein the object has a housing made of plastic or metal, the liquid is contained in the housing, and the antenna structure is arranged on a surface of the housing.

19. The device of claim 13, wherein each first conductive part or second conductive part is a polygon structure or has a curvature structure.

20. The device of claim 19, wherein the polygon structure is a rectangular structure, triangle structure or trapezoid structure.

21. The device of claim 13, wherein the first conductive structure is directly connected to a first side of the impedance matching part.

22. The device of claim 13, wherein the first conductive structure is spaced apart from the impedance matching part in the first direction.

23. The device of claim 13, wherein the impedance matching part further comprises a first lateral conductive structure and a second lateral conductive structure spaced apart from each other along a second axis, wherein the first lateral conductive structure has a first top side connected to the first electrical connection terminal and a first bottom side spaced apart from the first top side along a first axis, and the second lateral conductive structure has a second top side connected to the second electrical connection terminal and a second bottom side spaced apart from the second top side along the first axis, wherein the first conductive structure is electrically connected to the first top side and the second conductive structure is electrically connected to the second bottom side.

24. The device of claim 13, wherein the impedance matching part further comprises a first lateral conductive structure and a second lateral conductive structure parallel to each other and spaced apart from each other along a first axis, wherein a width of the first lateral conductive structure along the first axis is different from a width of the second lateral conductive structure along the first axis.

25. An antenna structure, comprising:
an impedance matching part, comprising a first electrical connection terminal, and a second electrical connection terminal;
a first conductive structure, connected to a first side of the impedance matching part, the first conductive structure having a first length along a first direction and having a plurality of first conductive parts wherein ends of two adjacent first conductive parts are connected by a first conductive element, and the plurality of first conductive parts are protruded toward a second direction perpendicular to the first direction, wherein at least some of the first conductive parts are triangle structures or trapezoid structures; and
a second conductive structure, connected to a second side of the impedance matching part, the second conductive structure having a second length which is larger than the first length along the first direction, and having a plurality of second conductive parts wherein ends of two adjacent second conductive parts are connected by a second conductive element, and the plurality of second conductive parts are protruded toward the second direction perpendicular to the first direction, wherein at least some of the second conductive parts are triangle structures or trapezoid structures.

26. The structure of claim 25, wherein a center position between the first electrical connection terminal and the second electrical connection terminal is located at a lateral side of a center line of the impedance matching part.

27. The structure of claim 25, further comprising a meander conductive structure arranged between the second conductive structure and the impedance matching part, wherein two opposite ends of the meander conductive structure are respectively connected to the second conductive structure and the impedance matching part.

28. The structure of claim 25, further comprising a meander conductive structure arranged between the first conductive structure and the impedance matching part, wherein two opposite ends of the meander conductive structure are respectively connected to the first conductive structure and the impedance matching part.

29. The structure of claim 25, wherein a width of each first conductive part along the first direction is the same as each other or different from each other.

30. The structure of claim 25, wherein a width of each second conductive part along the first direction is the same as each other or different from each other.

31. The structure of claim 25, further comprising:
a substrate, configured to support the impedance matching part, the first conductive structure, and the second conductive structure;
a RFID chip, electrically connected to the first and the second electrical connection terminals; and
a conductive paste layer, formed between the RFID chip and the first and the second electrical connection terminals.

32. The structure of claim 31, wherein the RFID chip is an ultra high frequency (UHF) chip.

33. An device having antenna structure, comprising:
an object, having a liquid contained therein; and
an antenna structure, arranged on a surface of the object, wherein the liquid is at another side opposite the surface, the antenna structure further comprising:
an impedance matching part, comprising a first electrical connection terminal, and a second electrical connection terminal;
a first conductive structure, connected to a first side of the impedance matching part, the first conductive structure having a first length along a first direction and having a plurality of first conductive parts wherein ends of two adjacent first conductive parts are connected by a first conductive element, and the plurality of first conductive parts are protruded toward a second direction perpendicular to the first direction, wherein at least some of the first conductive parts are triangle structures or trapezoid structures; and
a second conductive structure, connected to a second side of the impedance matching part, the second conductive structure having a second length which is larger than the first length along the first direction, and having a plurality of second conductive parts wherein ends of two adjacent second conductive parts are connected by a second conductive element, and the plurality of second conductive parts are protruded toward the second direction perpendicular to the first direction, wherein at least some of the second conductive parts are triangle structures or trapezoid structures.

34. The device of claim 33, wherein a center position of the first electrical connection terminal and the second electrical connection terminal is located at a lateral side of a center line of the impedance matching part.

35. The device of claim 33, further comprising a meander conductive structure arranged between the second conductive structure and the impedance matching part, wherein two opposite ends of the meander conductive structure are respectively connected to the second conductive structure and the impedance matching part.

36. The device of claim 33, further comprising a meander conductive structure arranged between the first conductive structure and the impedance matching part, wherein two opposite ends of the meander conductive structure are respectively connected to the first conductive structure and the impedance matching part.

37. The device of claim 33, wherein a width of each first conductive part along the first direction is the same as each other or different from each other.

38. The device of claim 33, wherein a width of each second conductive part along the first direction is the same as each other or different from each other.

39. The device of claim 33, wherein the antenna structure further comprises:
a substrate, configured to support antenna structure, wherein the substrate is a PET substrate or a PCB substrate;
a RFID chip, electrically connected to the first and the second electrical connection terminals, wherein the RFID chip is a ultra high frequency (UHF) chip; and
a conductive paste layer, formed between the RFID chip and the first and the second electrical connection terminals.

40. The device of claim 33, wherein the object has a housing made of plastic or metal, the liquid is contained in the housing, and the antenna structure is arranged on a surface of the housing.

* * * * *